(12) United States Patent
Wang et al.

(10) Patent No.: US 10,321,388 B2
(45) Date of Patent: Jun. 11, 2019

(54) METHOD AND DEVICE FOR FACILITATING TRANSMISSION OF ACCESS INFORMATION

(71) Applicant: Telefonaktiebolaget LM Ericsson (publ), Stockholm (SE)

(72) Inventors: Jianfeng Wang, Beijing (CN); Jinhua Liu, Beijing (CN); Yanli Zheng, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 182 days.

(21) Appl. No.: 15/112,848

(22) PCT Filed: Jul. 4, 2016

(86) PCT No.: PCT/CN2016/088321
§ 371 (c)(1),
(2) Date: Jul. 20, 2016

(87) PCT Pub. No.: WO2018/006222
PCT Pub. Date: Jan. 11, 2018

(65) Prior Publication Data
US 2018/0167871 A1 Jun. 14, 2018

(51) Int. Cl.
*H04W 48/20* (2009.01)
*H04W 48/16* (2009.01)
(Continued)

(52) U.S. Cl.
CPC ........... *H04W 48/16* (2013.01); *H04W 48/08* (2013.01); *H04W 48/12* (2013.01);
(Continued)

(58) Field of Classification Search
None
See application file for complete search history.

(56) References Cited

U.S. PATENT DOCUMENTS

| 9,622,211 B2 * | 4/2017 | Susitaival | H04W 68/02 |
| 2013/0230035 A1 * | 9/2013 | Grandhi | H04W 48/16 370/338 |

(Continued)

FOREIGN PATENT DOCUMENTS

| CN | 1757201 A | 4/2006 |
| CN | 103190164 A | 7/2013 |
| EP | 2136483 A1 | 12/2009 |

OTHER PUBLICATIONS

International Search Report and Written Opinion for Application No. PCT/CN2016/088321, dated Mar. 27, 2017, 12 pages.
(Continued)

*Primary Examiner* — Gary Lafontant
(74) *Attorney, Agent, or Firm* — Nicholson De Vos Webster & Elliott LLP

(57) ABSTRACT

Embodiments of the disclosure generally relate to transmission of access information. A network device generates an occurrence indication for indicating a subsequent occurrence of access information. Then, the network device transmits the occurrence indication in association with a system signature. The system signature indicates a part of the access information for use by a terminal device in accessing the network device. The power consumption of the terminal device in receiving the access information based on the occurrence indication can be reduced efficiently.

22 Claims, 5 Drawing Sheets

(51) Int. Cl.
*H04W 48/08* (2009.01)
*H04W 48/12* (2009.01)
*H04W 52/02* (2009.01)

(52) U.S. Cl.
CPC ......... *H04W 52/0216* (2013.01); *Y02D 70/00* (2018.01); *Y02D 70/1262* (2018.01); *Y02D 70/1264* (2018.01); *Y02D 70/26* (2018.01)

(56) References Cited

U.S. PATENT DOCUMENTS

2014/0010223 A1  1/2014  Wang et al.
2015/0264511 A1  9/2015  Rashid et al.

OTHER PUBLICATIONS

Communication pursuant to Article 94(3) EPC for Application No. EP16843266.4, dated Feb. 23, 2018, 6 pages.
Supplementary European Search Report for Application No. EP16843266.4, dated Feb. 5, 2018, 4 pages.
Frenger P., et al., "A Clean Slate Radio Network Designed for Maximum Energy Performance," 2014 IEEE 25th International Symposium on Personal, Indoor, and Mobile Radio Communications, Dec. 31, 2014, pp. 1300-1304.
International Preliminary Report on Patentability for Application No. PCT/CN2016/088321, dated Oct. 18, 2018, 4 pages.

* cited by examiner

METHOD AND DEVICE FOR FACILITATING TRANSMISSION OF ACCESS INFORMATION

CROSS-REFERENCE TO RELATED APPLICATIONS

This application is a National stage of International Application No. PCT/CN2016/088321, filed Jul. 4, 2016, which is hereby incorporated by reference.

TECHNICAL FIELD

Embodiments of the present disclosure generally relate to the field of communications, and more particularly, to a method and device for facilitating transmission of access information.

BACKGROUND

Accessing information is information used by a terminal device to access a wireless communication system. Generally, access information (for example, a broadcasted access information table (AIT)) is transmitted in a sparse style in order to reduce overhead for broadcast information. In some wireless communication systems, terminal devices are provided with access information by using broadcasted access information tables (AITs) and discovery signals. The discovery signals may be, for example, broadcasted system signatures (SSs) used to identify information from the broadcasted AIT.

The AIT may for example include settings concerning how a terminal device shall access the system, e.g., by a random access procedure, concerning how the terminal device can be reached by the system in a paging procedure, or concerning more advanced settings, such as related to beam forming or link adaptation. The AIT includes entries applying to various access nodes. The AIT is typically transmitted with long periodicity, while the SS is typically transmitted more frequently. Typically, each access node transmits an SS which allows the terminal device to identify the information applicable to this access node from the AIT. The AIT may be transmitted by one or more access nodes, but do not need to be transmitted by every access node.

Conventionally, the periodicity of the SS may be broadcasted in a small periodicity, for example, 100 ms, while the periodicity of the AIT is quite long, for example, 10240 ms. In such cases, the terminal device may have to perform long time blind detection before obtaining the access information. As a result, power consumption in blind detection of the access information is increased, which is undesirable and needs to be mitigated.

SUMMARY

In general, embodiments of the present disclosure provide a solution for facilitating transmission of access information.

In a first aspect, a method implemented at a network device is provided. The network device generates an occurrence indication for indicating a subsequent occurrence of access information. Then, the network device transmits the occurrence indication in association with a system signature. The system signature indicates a part of the access information for use by a terminal device in accessing the network device. The corresponding computer program is also provided.

In one embodiment, the network device may generate the occurrence indication by generating an indicator as to whether the subsequent occurrence of the access information is between a current occurrence and a subsequent occurrence of the system signature.

In one embodiment, the network device may determine a first time point indicating a start of the subsequent occurrence of the access information. Then, the network device may generate the occurrence indication based on information about the first time point.

In one embodiment, the network device may determine a system frame number corresponding to the first time point. Then, the network device may generate the occurrence indication based on the system frame number.

In one embodiment, the network device may determine auxiliary information about one or more of: transmission periodicity of the access information, a subsequent occurrence of the system signature, transmission periodicity of the system signature, and an index of the system signature; and generate the occurrence indication based on the auxiliary information.

In one embodiment, the network device may transmit the occurrence indication in parallel with the system signature; or transmit the occurrence indication after the system signature is transmitted.

In a second aspect, a method implemented at a terminal device is provided. In response to detecting a system signature, the terminal device detects an occurrence indication indicating a subsequent occurrence of access information. The system signature indicates a part of the access information for use by the terminal device in accessing a network device. The terminal device receives the access information based on the occurrence indication. The corresponding computer program is also provided.

In one embodiment, the terminal device may detect the occurrence indication in parallel with or after detection of the system signature.

In one embodiment, the terminal device may determine whether the occurrence indication includes an indicator as to whether the subsequent occurrence of the access information is between a current occurrence and a subsequent occurrence of the system signature; and in response to determining that the occurrence indication includes the indicator, detect the access information between the current occurrence and the subsequent occurrence of the system signature.

In one embodiment, the terminal device may obtain information about a first time point from the occurrence indication, the first time point indicating a start of the subsequent occurrence of the access information; and receive the access information at the first time point.

In one embodiment, the terminal device may obtain a system frame number from the occurrence indication, the system frame number indicating a frame including the subsequent occurrence of the access information; and receive the access information at the frame indicated by the system frame number.

In one embodiment, the terminal device may determine, based on the system signature, the part of the access information for use in accessing the network device.

In one embodiment, the terminal device may obtain auxiliary information from the occurrence indication. The auxiliary information may include one or more of: transmission periodicity of the access information, a subsequent occurrence of the system signature, transmission periodicity of the system signature, and an index of the system signature.

In a third aspect, an apparatus implemented at a network device is provided. The apparatus includes a generating unit and a transmitting unit. The generating unit is configured to generate an occurrence indication for indicating a subsequent occurrence of access information. The transmitting unit is configured to transmit the occurrence indication in association with a system signature, the system signature indicating a part of the access information for use by a terminal device in accessing the network device.

In a fourth aspect, an apparatus implemented at a terminal device is provided. The apparatus includes a detecting unit and a receiving unit. The detecting unit is configured to detect, in response to detecting a system signature, an occurrence indication indicating a subsequent occurrence of access information, the system signature indicating a part of the access information for use by the terminal device in accessing a network device. The receiving unit is configured to receive the access information based on the occurrence indication.

In a fifth aspect, a network device is provided. The network device includes: a processor and a memory. The memory contains instructions executable by the processor, whereby the processor being adapted to cause the network device to perform the method according to the first aspect of the present disclosure.

In a sixth aspect, a terminal device is provided. The terminal device includes: a processor and a memory. The memory contains instructions executable by the processor, whereby the processor being adapted to cause the terminal device to perform the method according to the second aspect of the present disclosure.

According to various embodiments of the present disclosure, by using the occurrence indication, much less time and energy may be needed for a terminal device to detect the access information. In this way, power consumption of the terminal device can be significantly reduced.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1A:
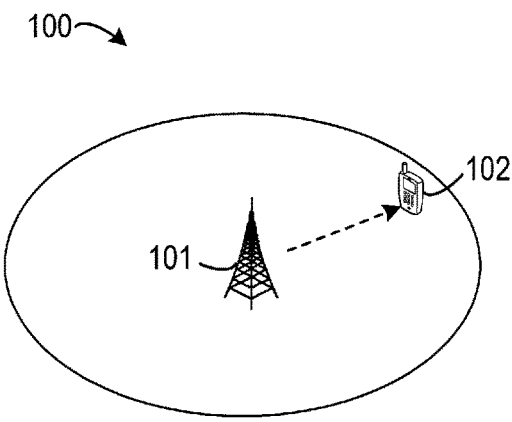
FIG. 1A shows a schematic diagram 100 of a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" refers to any end device that can access a wireless communication network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, a pedestrian and the like.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Now some exemplary embodiments of the present disclosure will be described below with reference to the figures. Reference is first made to FIG. 1A, which shows a schematic diagram 100 of a wireless communication network. There illustrates a network device 101 and a terminal device 102 in the wireless communication network. In the example of FIG. 1A, the network device 101 broadcasts a system signature in a predetermined periodicity of the system signature (also refereed as to "SS cycle" or "SS TX cycle" hereafter) and access information in a predetermined periodicity of the AIT (also refereed as to "AIT cycle" or "AIT TX cycle" hereafter). The terminal device 102 may detect the SS and the AIT to obtain useful information to access the network device 101.

In embodiments of the present disclosure, the access information is sometimes described as AIT. However, it is to be understood that this is for purpose of discussion, rather than limitation. AIT is merely an example of the access information. Those skilled in the art would appreciate that the access information may be implemented in many other suitable forms, as long as including information concerning how a terminal device accesses the system, such as system information for random access, paging information, beamforming information, and so on.

It is to be understood that the configuration of FIG. 1A is described merely for the purpose of illustration, without suggesting any limitation as to the scope of the present disclosure. Those skilled in the art would appreciate that the wireless communication network 100 may include any suitable number of terminal devices and/or network devices and may have other suitable configurations. Those skilled in the art would also appreciate that the network device 101 may just transmit the system signature without the AIT, and the AIT may be broadcasted from another network device in the wireless communication network 100.

Figure 1B:
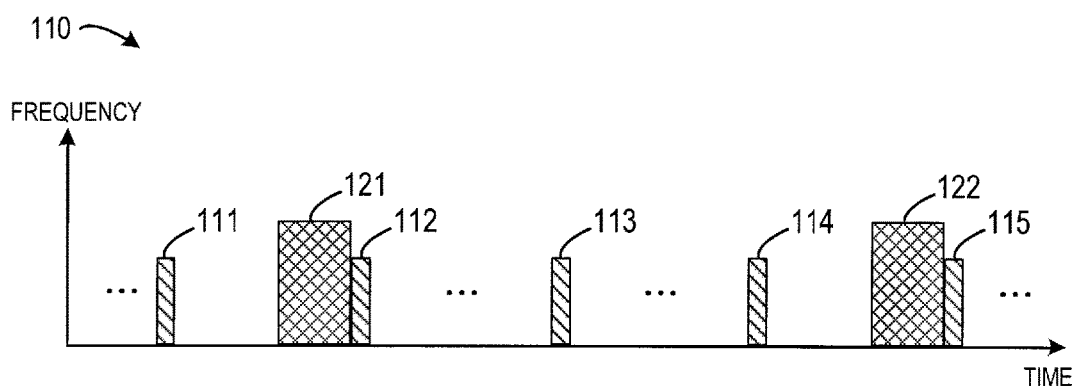
FIG. 1B shows a schematic diagram 110 of conventional transmission of access information and a system signature in the wireless communication network.

Reference is now made to FIG. 1B, which illustrates a schematic diagram 110 of conventional transmission of access information and a system signature in the wireless communication network. In FIG. 1B, the network device 101 broadcasts the system signature at a short periodicity, for example, 100 ms, and the access information is broadcasted at a relatively long periodicity, for example, 10240 ms. The example of FIG. 1B illustrates five occurrences 111-115 of the system signature and two occurrences 121 and 122 of the access information. In the example, the occurrence 121 may be referred to as a current occurrence of the access information, and the occurrence 122 may be referred to as a subsequent occurrence of the access information.

Conventionally, the terminal device 102 which is just powered up or enters a new area does not have the knowledge regarding the time of occurrences of the access information. Since the access information is broadcasted at a relatively long periodicity, the terminal device 102 may thus have to consume a lot of power to blind detect the access information. In another example, for the terminal device 102 in inactive mobility state, if it relies on blind detection to determine the access information, the power consumption for the blind detection is considerable.

As shown in FIG. 1B, assuming that there is one AIT with every 10 system signatures, the periodicity of the system signature (SS cycle) is 100 ms and the periodicity of the AIT (AIT cycle) is 10240 ms, a new terminal device may have to try blind detection for up to 102 broadcasts transmission intervals before the subsequent occurrence of the AIT. Thus, a time duration for blind decoding the AIT can be up to 1020 ms. If the AIT cycle, 10240 ms, is not exactly divided by the SS cycle, 100 ms, there may be multiple time offsets (for example, 40 ms, 80 ms, 20 ms, 60 ms, . . . ) between start points of transmissions of AIT and start points of transmissions of the system signature. In such a case, much more time may be needed for blind decoding of the AIT. As a result, power consumption in detection of the AIT is undesirably increased.

Furthermore, if the AIT cycle and/or the SS cycle are changed in some conditions, the terminal device 102 may have to frequently try blind detections in different positions to determine the new cycle(s), which considerably increases the power consumption of the terminal device, especially when the terminal device is in inactive mobility state.

Figure 2A:
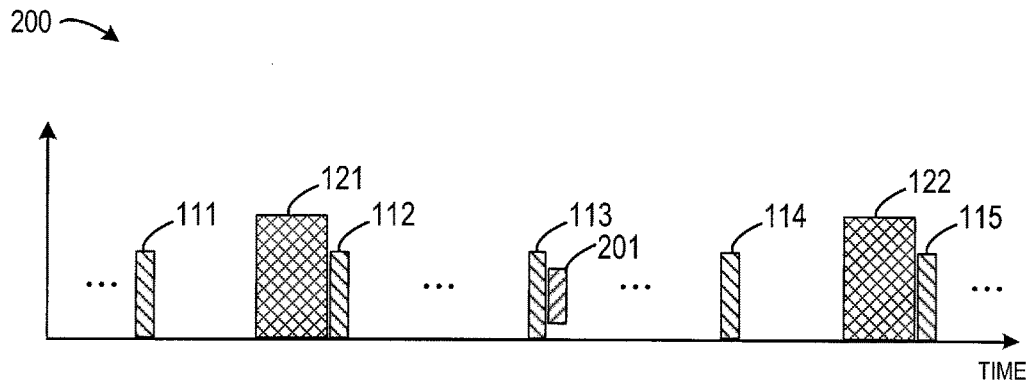
FIG. 2A shows a schematic diagram 200 of transmission of access information and a system signature according to an embodiment of the present disclosure.
Figure 2B:
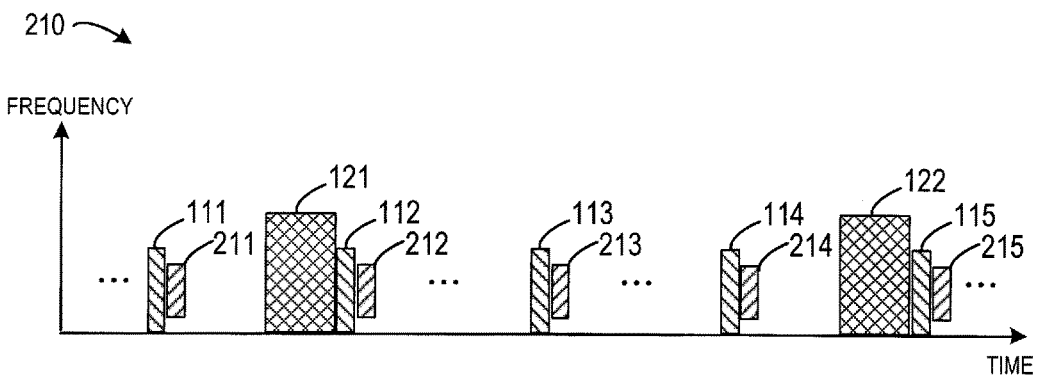
FIG. 2B shows a schematic diagram 210 of transmission of access information and a system signature according to another embodiment of the present disclosure.

In order to solve the above and other potential problems, embodiments of the present disclosure provide solutions to reduce power consumption of the terminal device in detecting the access information. In accordance with embodiments of the present disclosure, an occurrence indication is generated for indicating a subsequent occurrence of the access information, and transmitted in association with a system signature. Upon receipt of the occurrence indication, the terminal device can determine a time point or a reduced time interval of the subsequent occurrence of the access information. By detecting the access information at the determined time point or the reduced time interval, instead of blind detecting in a long time duration, the power consumption of the terminal device can be reduced. FIGS. 2A and 2B show schematic diagrams 200 and 210 of transmission of access information and a system signature according to the embodiments of the present disclosure, respectively.

In the example of FIG. 2A, an occurrence indication is transmitted in association with one occurrence of a system signature. As shown, the occurrence indication 201 is generated after the previous occurrence 121 of the access information, and is transmitted in association with the occurrence 113 of the system signature to indicate the next occurrence 122 of the access information.

As an alternative, one occurrence indication may be transmitted in association with each occurrence of the system signature. In the example of FIG. 2B, five occurrence indications 211-215 are generated after the previous occurrence 121 of the access information, and are transmitted in association with the occurrences 111-115 of the system signature. Each of the occurrence indications 211-215 may indicate the next occurrence 122 of the access information.

It is to be understood that although some exemplary embodiments of the present disclosure will be described below with reference to FIGS. 2A and 2B, they are described merely for the purpose of illustration, without suggesting any limitation as to the scope of the present disclosure. Those skilled in the art will appreciate that there may be many other suitable ways to implement embodiments of the present disclosure.

Figure 3:
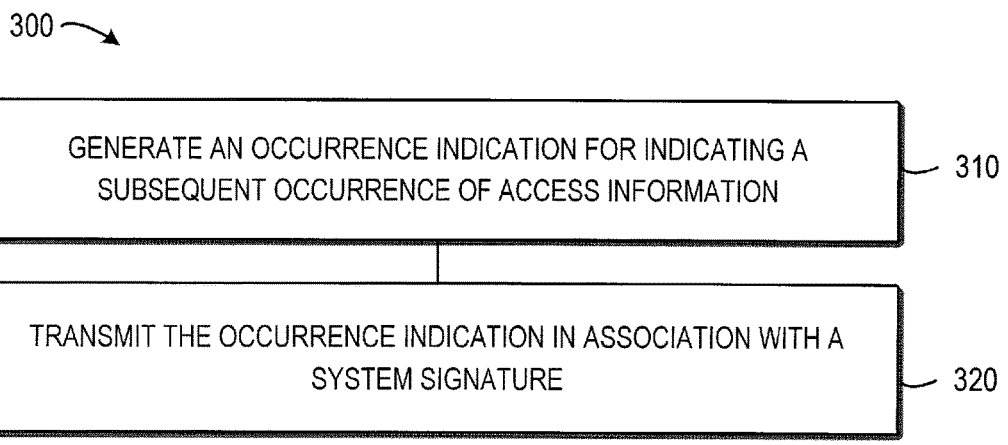
FIG. 3 shows a flowchart of a method 300 for facilitating transmission of access information at a network device in accordance with an embodiment of the present disclosure.

FIG. 3 shows a flowchart of a method 300 for latency reduction implemented by a network device in accordance with an embodiment of the present disclosure. With the method 300, the above and other potential deficiencies in the conventional approaches can be overcome. It would be appreciated by those skilled in the art that the method 300 may be implemented by a network device, such as a BS, a server, a controller or other suitable devices. The network device may be, for example, but not limited to, the network device 101 of FIG. 1.

The method 300 is entered in block 310, where an occurrence indication for indicating a subsequent occurrence of access information is generated. In accordance with embodiments of the present disclosure, the occurrence indication may be generated in a variety of ways. In some embodiments, an indicator may be generated as to whether the subsequent occurrence of the access information is between a current occurrence and a subsequent occurrence of the system signature. The occurrence indication may be generated by including this indicator, such that a terminal device receiving the occurrence indication can detect the subsequent occurrence of the access information at a relatively short time interval. The terminal device may be, for example, but not limited to, the terminal device 102 of FIG. 1.

In an embodiment, as shown in FIG. 2B, if the current occurrence of the system signature is 113 and the subsequent occurrence of the system signature is 114, the network device may determine that the subsequent occurrence 122 of the access information is not between the occurrences 113 and 114 of the system signature and may generate an indicator to indicate that there is no access information between the occurrences 113 and 114. Upon receipt of the occurrence indication 213 including such an indicator, the terminal device may go to sleep or do something else until next occurrence of the system signature comes.

In another embodiment of FIG. 2B, if the current occurrence of the system signature is 114 and the subsequent occurrence of the system signature is 115, the network device may determine that the subsequent occurrence 122 of the access information is between the occurrences 114 and 115 of the system signature and may generate an indicator to indicate that there is access information between the occurrences 114 and 115. Upon receipt of the occurrence indication 214 including such an indicator, the terminal device may perform blind detection for the access information in the current SS cycle (that is, the time interval between the occurrences 114 and 115 of the system signature). As such, the terminal device detects the access information in a relatively short time interval, instead of in each SS cycle. In this way, the power consumption can also be considerably decreased.

Alternatively, the occurrence indication may include an explicit time point of the subsequent occurrence of the access information. In some embodiments, a first time point indicating a start of the subsequent occurrence of the access information may be determined, and the occurrence indication may be generated based on information about the first time point. For instance, the occurrence indication may include the information about the first time point, such that the terminal device may understand that the subsequent occurrence of the access information will start at the first time point upon receipt the occurrence indication. In an embodiment, the first time point may be implemented as a descending counter to indicate the time gap to the subsequent occurrence of the access information. By way of example, a 7-bit counter may be employed when the AIT cycle is 10240 ms and the SS cycle is 100 ms.

As a further alternative, in some embodiments, the occurrence indication may include system frame number (SFN) corresponding to the first time point to indicate the start of the subsequent occurrence of the access information, instead of including the first time point. In the embodiments, system frame number corresponding to the first time point may be determined firstly, and then the occurrence indication may be generated based on the system frame number. In this way, a terminal device can detect the subsequent occurrence of the access information at the frame indicated by the system frame number.

The occurrence indication may further include other suitable auxiliary information, in addition to the indicator, the first time point, as well as the system frame number corresponding thereto. In some embodiments, in block 310, the network device may determine auxiliary information about transmission periodicity of the access information, a subsequent occurrence of the system signature, transmission periodicity of the system signature, an index of the system signature, and/or the like. Then, the network device may generate the occurrence indication based on the auxiliary information.

The transmission periodicity of the access information (that is, the AIT cycle) may be indicated by a few bits in the occurrence indication. For example, the occurrence indication may use 2 bits to indicate 4 AIT cycles. In some embodiments, if the AIT cycle is not explicitly included, and if a descending counter is included in the occurrence indication to indicate the time gap to the subsequent occurrence of the access information, the terminal device may determine the AIT cycle by detecting the counter value of the first occurrence indication after the AIT is detected.

The subsequent occurrence of the system signature and/or transmission periodicity of the system signature (that is, SS cycle) may be also included in the occurrence indication. As such, when the system signature is broadcasted with a large number of repeated transmission and/or high gain beamforming, power consumption of the terminal device for blind detecting the system signature and/or determining the SS cycle can be reduced significantly.

The index of the system signature may be used to identify a system signature. By including the index to the occurrence identification, the terminal device can know which system signature is associated with the occurrence identification, for example, which system signature is transmitted together with the occurrence identification.

In some embodiments, the SS cycle and AIT cycle may be predefined to be dependent and indicated with the same indicator. For instance, an AIT cycle may be predefined to be N (integer) times of the SS cycle, then one indicator may be used to indicate change of the AIT cycle or the SS TX cycle.

Still referring to FIG. 3, in block 320, the occurrence indication is transmitted in association with a system signature. The system signature indicates a part of the access information for use by a terminal device in accessing the network device. In some embodiments, the occurrence indication may be transmitted in parallel with the system signature. Alternatively, the occurrence indication may be transmitted after the system signature is transmitted. For instance, the occurrence indication may be transmitted immediately after the system signature, or may be transmitted after the system signature for a predetermined time period. The predetermined time period may be preset in multiple ways, for example, according to system requirements, empirical values, and/or other regulations.

The occurrence indication may be transmitted in different forms, for example, depending on its size. In an embodiment, if the occurrence indication has a large size, for instance, 30-40 bits, then the occurrence indication may be coded by convolutional code with CRC sequenced appended. In another embodiment, if the occurrence indication has a small size, for instance, 1 bit for indicating whether the access information occurs in the current SS cycle, then one sequence with good self-correlation (e.g. m sequence) may be used. It is to be understood that the above sizes of bits are just examples, rather than limitation. Those skilled in the art may determine a proper form for transmitting the occurrence indication based on its size in any other suitable ways.

In some embodiments, resource for occurrence indication in the physical layer may be pre-defined with K subframes in the time domain and Q subcarriers in the frequency domain. As used herein, the term "subframe" refers to a basic schedule unit in the physical layer, and the term "subcarrier" refers to a basic unit in an Orthogonal Frequency Division Multiplexing (OFDM)-based system. The K subframes may be contiguous or discontinuous, and the Q subcarriers may be contiguous or discontinuous, both depending on system requirements and/or other regulations.

In some embodiments, to enable the terminal device to detect the access information, the transmission format parameters of occurrence indication, including the transport block size, modulation mode, coding rate and other suitable information may be pre-defined and available at both the network device and the terminal device sides. In the embodiments, a special reference sequence may be inserted into one OFDM symbol as a self-contained reference signal, to provide the time/frequency synchronization, channel estimation and occurrence detection. In some alternative embodiments, if the occurrence indication is transmitted in association with each system signature, the system signature may be also used as a reference signal.

In view of the forgoing, with the occurrence indication, much less time and energy may be needed for a terminal device to detect the access information. In this way, power consumption of the terminal device can be significantly reduced.

Figure 4:
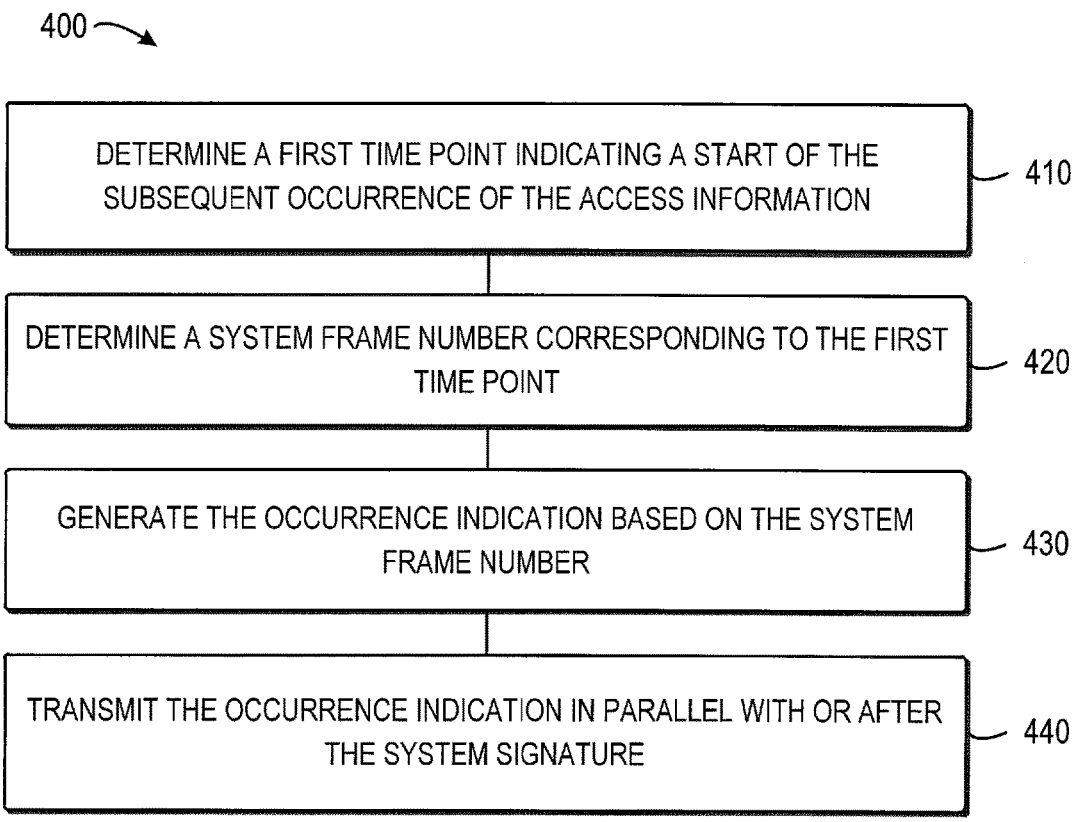
FIG. 4 shows a flowchart of a method 400 for facilitating transmission of access information at a network device in accordance with another embodiment of the present disclosure.

Reference is now made to FIG. 4, which shows a flowchart of a method 400 for facilitating transmission of access information at a network device in accordance with another embodiment of the present disclosure. It would be appreciated by those skilled in the art that the method 400 is an implementation of the method 300 and may be implemented by a network device. In embodiments of FIG. 4, the occurrence indication includes a SFN indicating the subsequent occurrence of access information. It is to be understood that the method 300 may be implemented in several ways as discussed above, and the method 400 is only one example instead of limitation.

The method 400 is entered in block 410, where a first time point indicating a start of the subsequent occurrence of the access information is determined. The first time point may be determined in several ways. In an embodiment, the first time point may be calculated according to AIT cycle, the previous occurrence of the access information, and the current occurrence of the system signature. In another embodiment, the first time point may be determined from configurations in which starting time points of each occurrence of the access information may be predefined.

In block 420, a system frame number corresponding to the first time point is determined. The system frame number, SFN, is an index for a frame. The length of a frame is also referred to as a SFN cycle. With the knowledge of the first time point, the network device may determine a corresponding SFN based on the first time point and the SFN cycle. It is to be understood that this is just an example, rather than limitation. Those skilled in the art would appreciate that the SFN corresponding to the first time point can be determined in any other suitable ways.

In block 430, the occurrence indication is generated based on the system frame number. In some embodiments, if the SFN cycle aligns with the AIT cycle in some sense, for instance the SFN cycle can be exactly divided by the AIT cycle, less bits may be used to indicate the subsequent occurrence of the access information and/or the AIT cycle.

In block 440, the occurrence indication is transmitted in parallel with the system signature or after the system signature is transmitted. This block is similar to block 320, and thus is not detailed here for purpose of simplicity.

Figure 5:
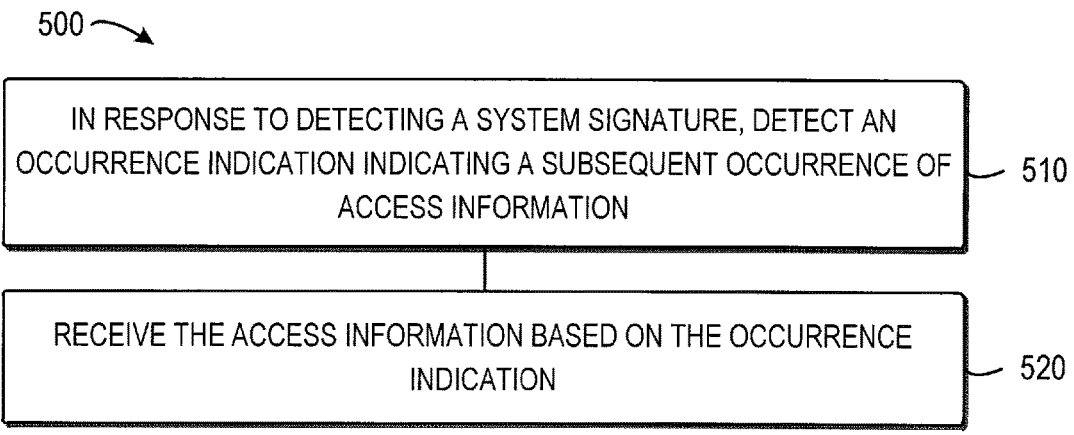
FIG. 5 shows a flowchart of a method 500 for facilitating transmission of access information at a terminal device in accordance with an embodiment of the present disclosure.

Embodiments of the present disclosure also disclose operations performed at the terminal device side. FIG. 5 shows a flowchart of a method 500 for facilitating transmission of access information in accordance with an embodiment of the present disclosure. With the method 500, the above and other potential deficiencies in the conventional approaches can be overcome. It would be appreciated by those skilled in the art that the method 500 may be implemented by a terminal device, such as a UE or other suitable devices. The terminal device may be, for example, but not limited to, the terminal device 102 of FIG. 1.

The method 500 is entered in block 510, where in response to detecting a system signature, the terminal device detects an occurrence indication indicating a subsequent occurrence of access information. The system signature may indicate a part of the access information for use by the terminal device in accessing a network device. The network device may be, for example, but not limited to, the network device 101 of FIG. 1.

In an embodiment, as shown in the example of FIG. 2B, if the current occurrence of the system signature is 114 and the subsequent occurrence of the system signature is 115, the network device 101 may determine that the subsequent occurrence 122 of the access information is between the occurrences 114 and 115 of the system signature and may generate an occurrence indication to indicate that there is access information between the occurrences 114 and 115, or a start time point of the subsequent occurrence of the access information. The terminal device 102 may detect the system signature blindly. For example, once the occurrence 114 of the system signature is detected, the terminal device 102 may detect an occurrence indication 214 in parallel with or after the detection of the occurrence 114 of the system signature.

It is to be understood that, the above examples are discussed for illustration, rather than limitation. Those skilled in the art would appreciate that in some embodiments, the occurrence indication may be detected immediately after the system signature is detected, or after the system signature is detected for a predetermined time interval.

In block 520, the terminal device receives the access information based on the occurrence indication. The access information may be received in a variety of ways. In some embodiments, the terminal device may determine whether the occurrence indication includes an indicator as to whether the subsequent occurrence of the access information is between a current occurrence and a subsequent occurrence of the system signature. If the occurrence indication includes the indicator, the terminal device may detect the access information between the current occurrence and the subsequent occurrence of the system signature. As such, the access information can be detected in a short time interval, which reduces power consumption of the terminal device.

In this way, the terminal device can determine the next AIT transmission time/occurrence by successful detection and decoding of the occurrence indication. In an example, assuming that the occurrence indication only carries the counter to point the following AIT transmission time. After the terminal device detects the first SS, the terminal device may further detect the occurrence indication followed the SS. If the occurrence indication detection fails, the terminal device may try to detect the next occurrence indication until occurrence indication is detected. If one occurrence indication is successfully detected, the terminal device can determine the coming AIT occurrence. The terminal device may go to sleep until the next AIT transmission starts. After the AIT is successfully detected, the terminal device may further detect the occurrence indication immediately after the AIT transmission to determine the AIT cycle.

Alternatively, in some embodiments, the terminal device may obtain information about a first time point from the occurrence indication. The first time point may indicate a start of the subsequent occurrence of the access information. Thus, the terminal device may know when the subsequent occurrence of the access information starts. Then, the terminal device may receive the access information at the first time point.

As a further alternative, in some embodiments, the terminal device may obtain the access information based on a system frame number, SFN, indicating a frame including the subsequent occurrence of the access information. In particular, the terminal device may obtain a SFN from the occurrence indication, and then receive the access information at the frame indicated by the SFN.

In addition, in some embodiments, the terminal device may obtain auxiliary information from the occurrence indication. The auxiliary information may include transmission periodicity of the access information, a subsequent occurrence of the system signature, transmission periodicity of the system signature, an index of the system signature, and/or the like.

Figure 6:
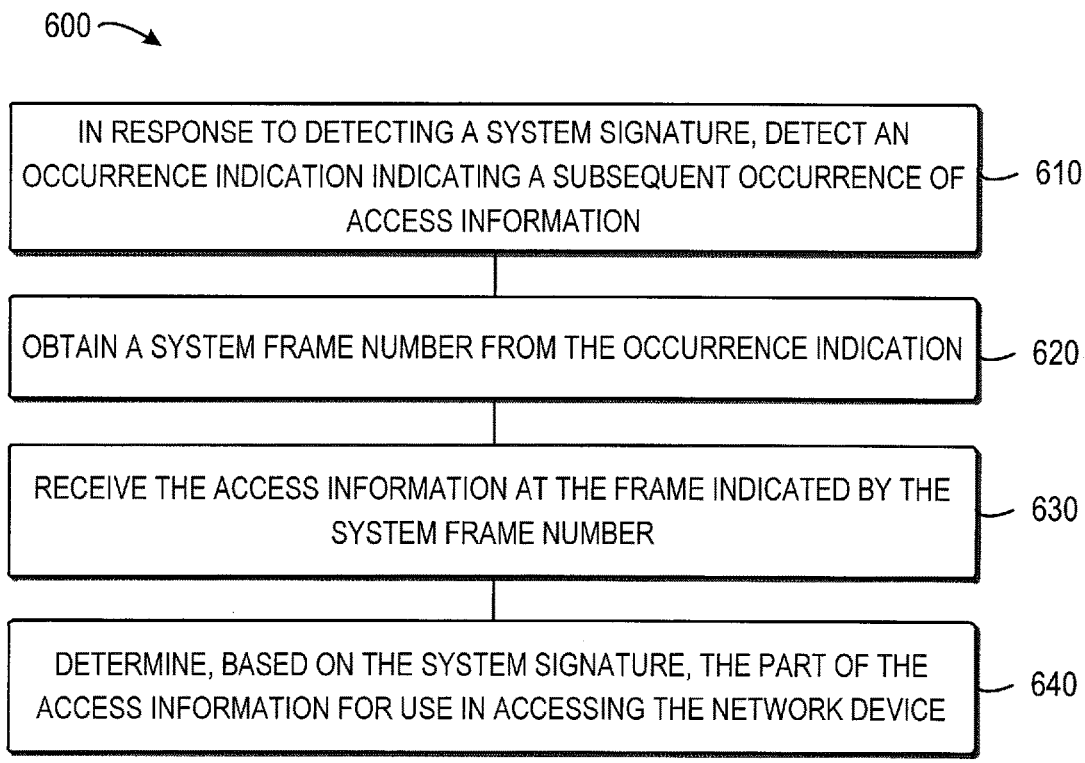
FIG. 6 shows a flowchart of a method 600 for facilitating transmission of access information at a terminal device in accordance with another embodiment of the present disclosure.

Reference is now made to FIG. 6, which shows a flowchart of a method 600 for facilitating transmission of access information at a terminal device in accordance with another embodiment of the present disclosure. It would be appreciated by those skilled in the art that the method 600 is an implementation of the method 500 and may be implemented by a terminal device. In embodiments of FIG. 6, the occurrence indication includes a SFN indicating the subsequent occurrence of access information. It is to be understood that the method 500 may be implemented in several ways as discussed above, and the method 600 is only one example instead of limitation.

The method 600 is entered in block 610, where in response to detecting a system signature, the terminal device detects an occurrence indication indicating a subsequent occurrence of access information. This block is similar to block 510, and thus is not detailed here for purpose of simplicity.

In block 620, the terminal device obtains a system frame number from the occurrence indication. The system frame number may indicate a frame including the subsequent occurrence of the access information. In block 630, the terminal device receives the access information at the frame indicated by the system frame number. For instance, the terminal device may blind detect the access information at the frame.

As discussed above, the system signature may be used to identify information from the access information. In block 640, based on the system signature, the terminal device may determine a part of the access information for use in accessing the network device. The part of the access information may include, for example, but not limited to, system information for random access, paging information, beamforming information, and so on.

Optionally, in some embodiments, the SS cycle and/or AIT cycle may be adjusted in relation to the traffic load change, mobility statistics of a terminal device (for example, a UE), and so on. The AIT cycle and/or the SS cycle may be adjusted in AP wise or different spatial directions of one AP may have different AIT cycles and/or the SS cycles. In some cases, it is better to notify the UE regarding the SS cycle change, rather than to let the UE to blindly detect the change. For example, if there is predefined dependence between AIT cycle and SS cycle and an AIT TX counter decreases by one in each SS cycle, the UE may derive the SS cycle change based on the detection of AIT cycle. In another example, to reduce delay in determination of the SS cycle change due to the long cycle of AIT transmission, the UE may also determine the SS cycle change based on detection of two occurrence indications. Assuming a descending counter is used to indicate the AIT occurrence, the UE may detect a first occurrence indication according to the current SS cycle and stores the detected AIT TX indicator value (e.g. the descending counter). Next, the UE may detect a second occurrence indication according to the current or default SS cycle and stores the detected AIT TX indicator value (e.g. the descending counter). Then, the UE may determine the new SS TX cycle based on the current SS cycle and the AIT TX counter value difference, for example, according to the following equation:

$$P_{ss,new} = \frac{m \cdot P_{SS,old}}{V_1 - V_2} \quad (1)$$

Where m is the number of old SS cycles between the two SSB detections, $P_{SS,old}$ and $P_{SS,new}$ are old and new SS cycle respectively, $V_1$ and $V_2$ are AIT TX counter values.

In this way, the SS cycle and/or AIT cycle may be determined and/or adjusted in a dynamical way.

Figure 7:
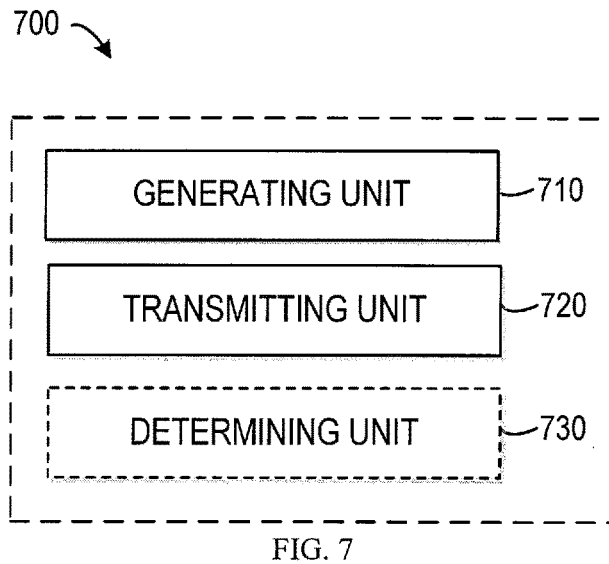
FIG. 7 shows a block diagram of an apparatus 700 implemented at a network device in accordance with an embodiment of the present disclosure.

Now reference is made to FIG. 7 which shows a block diagram of an apparatus 700 implemented at a network device in accordance with an embodiment of the present disclosure. It would be appreciated that the apparatus 700 may be implemented at a network device, such as a BS, a server, a controller or other suitable devices.

As shown, the apparatus 700 includes a generating unit 710 and a transmitting unit 720). The generating unit 710 is configured to generate an occurrence indication for indicating a subsequent occurrence of access information. The transmitting unit 720 is configured to transmit the occurrence indication in association with a system signature. The system signature indicating a part of the access information for use by a terminal device in accessing the network device.

In an embodiment, the generating unit 710 may be further configured to: generate an indicator as to whether the subsequent occurrence of the access information may be between a current occurrence and a subsequent occurrence of the system signature.

In an embodiment, the apparatus 700 may further include a determining unit 730 configured to determine a first time point indicating a start of the subsequent occurrence of the access information. In the embodiment, the generating unit 710 may be further configured to generate the occurrence indication based on information about the first time point.

In an embodiment, the determining unit 730 may be configured to determine a system frame number corresponding to the first time point. The generating unit 710 may be further configured to generate the occurrence indication based on the system frame number.

In an embodiment, the determining unit 730 may be configured to determine auxiliary information about one or more of: transmission periodicity of the access information, a subsequent occurrence of the system signature, transmission periodicity of the system signature, and an index of the system signature. The generating unit 710 may be further configured to generate the occurrence indication based on the auxiliary information.

In an embodiment, the transmitting unit 720 may be further configured to: transmit the occurrence indication in parallel with the system signature or transmit the occurrence indication after the system signature is transmitted.

Figure 8:
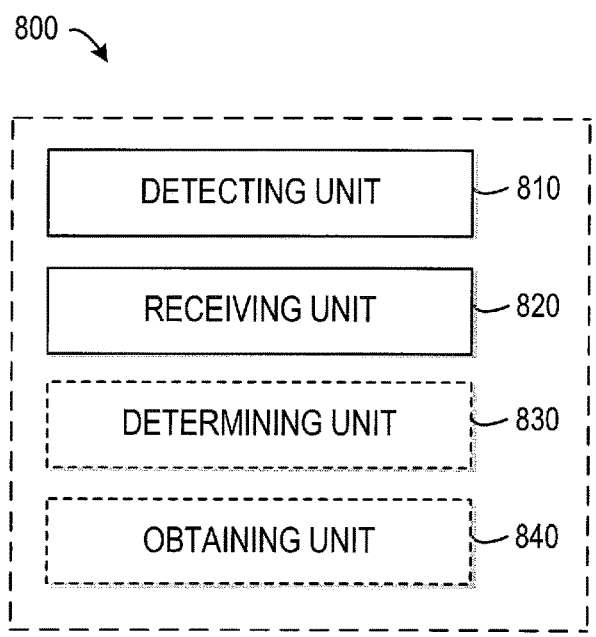
FIG. 8 shows a block diagram of an apparatus 800 implemented at a terminal device in accordance with an embodiment of the present disclosure.

Now reference is made to FIG. 8 which shows a block diagram of an apparatus 800 implemented at a terminal device in accordance with an embodiment of the present disclosure. It would be appreciated that the apparatus 800 may be implemented at a terminal device or other suitable devices.

As shown, the apparatus 800 includes a detecting unit 810 and a receiving unit 820). The detecting unit 810 is configured to detect, in response to detecting a system signature, an occurrence indication indicating a subsequent occurrence of access information. The system signature indicates a part of the access information for use by the terminal device in accessing a network device. The receiving unit 820 is configured to receive the access information based on the occurrence indication.

In an embodiment, the detecting unit 810 may be further configured to: detect the occurrence indication in parallel with the system signature or detect the occurrence indication after the detection of the system signature.

In an embodiment, the apparatus 800 may further include: a determining unit 830 configured to determine whether the occurrence indication includes an indicator as to whether the subsequent occurrence of the access information is between a current occurrence and a subsequent occurrence of the system signature. The receiving unit 820 may be further configured to, in response to determining that the occurrence indication includes the indicator, receive the access information between the current occurrence and the subsequent occurrence of the system signature.

In an embodiment, the apparatus 800 may further include: an obtaining unit 840 configured to obtain information about a first time point from the occurrence indication. The first time point indicates a start of the subsequent occurrence of the access information. The receiving unit 820 may be further configured to receive the access information at the first time point.

In an embodiment, the apparatus 800 may further include: an obtaining unit 840 configured to obtain a system frame number from the occurrence indication. The system frame number indicates a frame including the subsequent occurrence of the access information. The receiving unit 820 may be further configured to receive the access information at the frame indicated by the system frame number.

In an embodiment, the apparatus 800 may further include: a determining unit 830 configured to determine, based on the system signature, the part of the access information for use in accessing the network device.

In an embodiment, the apparatus 800 may further include: an obtaining unit 840 configured to obtain auxiliary information from the occurrence indication. The auxiliary information may include one or more of: transmission periodicity of the access information, a subsequent occurrence of the system signature, transmission periodicity of the system signature, and an index of the system signature.

It should be appreciated that components included in the apparatus 700 correspond to the operations of the methods 300 and 400, and components included in the apparatus 800 correspond to the operations of the methods 500 and 600. Therefore, all operations and features described above with reference to FIGS. 3 and 4 are likewise applicable to the components included in the apparatus 700 and have similar effects, and all operations and features described above with reference to FIGS. 5 and 6 are likewise applicable to the components included in the apparatus 800 and have similar effects. For the purpose of simplification, the details will be omitted.

The components included in the apparatuses 700 and 800 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the apparatuses 700 and 800 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented at a network device. The apparatus includes: means for generating an occurrence indication for indicating a subsequent occurrence of access information; and means for transmitting the occurrence indication in association with a system signature, the system signature indicating a part of the access information for use by a terminal device in accessing the network device.

In an embodiment, the means for generating the occurrence indication may include: means for generating an indicator as to whether the subsequent occurrence of the access information is between a current occurrence and a subsequent occurrence of the system signature.

In an embodiment, the means for generating the occurrence indication may include: means for determining a first time point indicating a start of the subsequent occurrence of the access information; and means for generating the occurrence indication based on information about the first time point.

In an embodiment, the means for generating the occurrence indication based on information about the first time point may include: means for determining a system frame number corresponding to the first time point; and means for generating the occurrence indication based on the system frame number.

In an embodiment, the means for generating the occurrence indication may include: means for determining auxiliary information about one or more of: transmission periodicity of the access information, a subsequent occurrence of the system signature, transmission periodicity of the system signature, and an index of the system signature; and means for generating the occurrence indication based on the auxiliary information.

In an embodiment, the means for transmitting the occurrence indication in association with a system signature may include: means for transmitting the occurrence indication in parallel with the system signature; or means for transmitting the occurrence indication after the system signature is transmitted.

In accordance with embodiments of the present disclosure, there is provided an apparatus implemented at a terminal device. The apparatus includes: means for, in response to detecting a system signature, detecting an occurrence indication indicating a subsequent occurrence of access information, the system signature indicating a part of the access information for use by the terminal device in accessing a network device; and means for receiving the access information based on the occurrence indication.

In an embodiment, means for detecting the occurrence indication may include: means for detecting the occurrence indication in parallel with the system signature; or means for detecting the occurrence indication after the detection of the system signature.

In an embodiment, means for receiving the access information based on the occurrence indication may include: means for determining whether the occurrence indication includes an indicator as to whether the subsequent occurrence of the access information is between a current occurrence and a subsequent occurrence of the system signature; and means for, in response to determining that the occurrence indication includes the indicator, detecting the access information between the current occurrence and the subsequent occurrence of the system signature.

In an embodiment, means for receiving the access information based on the occurrence indication may include: means for obtaining information about a first time point from the occurrence indication, the first time point indicating a start of the subsequent occurrence of the access information; and means for receiving the access information at the first time point.

In an embodiment, means for receiving the access information based on the occurrence indication may include: means for obtaining a system frame number from the occurrence indication, the system frame number indicating a frame including the subsequent occurrence of the access information; and means for receiving the access information at the frame indicated by the system frame number.

In an embodiment, the apparatus may further include means for determining, based on the system signature, the part of the access information for use in accessing the network device.

In an embodiment, the apparatus may further include means for obtaining auxiliary information from the occurrence indication, the auxiliary information including one or more of: transmission periodicity of the access information, a subsequent occurrence of the system signature, transmission periodicity of the system signature, and an index of the system signature.

Figure 9:
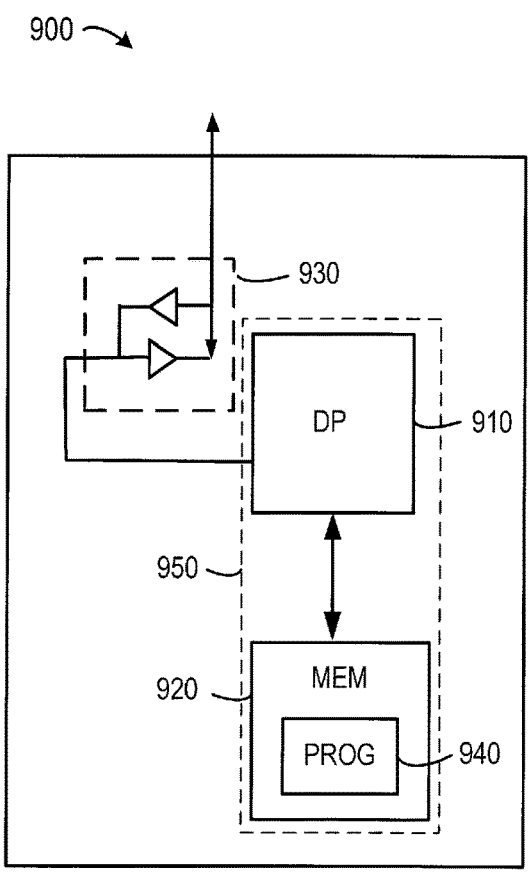
FIG. 9 shows a simplified block diagram 900 of a device that is suitable for use in implementing embodiments of the present disclosure.

FIG. 9 shows a simplified block diagram of a device 900 that is suitable for implementing embodiments of the present disclosure. It would be appreciated that the device 900 may be implemented as at least a part of, for example, the network device 101 or the terminal device 102.

As shown, the device 900 includes a communicating means 930 and a processing means 950. The processing means 950 includes a data processor (DP) 910, a memory (MEM) 920 coupled to the DP 910. The communicating means 930 is coupled to the DP 910 in the processing means 950. The MEM 920 stores a program (PROG) 940. The communicating means 930 is for communications with other devices, which may be implemented as a transceiver for transmitting/receiving signals.

In some embodiments where the device 900 acts as a network device, the processing means 950 may be configured to generate an occurrence indication for indicating a subsequent occurrence of access information, and the communicating means 930 may be configured to transmit the occurrence indication in association with a system signature. In some other embodiments where the device 900 acts as a terminal device, the processing means 950 may be configured to detect, in response to detecting a system signature, an occurrence indication indicating a subsequent occurrence of access information, and the communicating means 930 may be configured to receive the access information based on the occurrence indication.

The PROG 940 is assumed to include program instructions that, when executed by the associated DP 910, enable the device 900 to operate in accordance with the embodiments of the present disclosure, as discussed herein with the method 200, 300 or 400. The embodiments herein may be implemented by computer software executable by the DP 910 of the device 900, or by hardware, or by a combination of software and hardware. A combination of the data processor 910 and MEM 920 may form processing means 950 adapted to implement various embodiments of the present disclosure.

The MEM 920 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 900, there may be several physically distinct memory modules in the device 900. The DP 910 may be of any type suitable to the local technical environment, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a network device, comprising:
generating an occurrence indication for indicating a subsequent occurrence of access information, wherein the access information comprises an access information table that indicates a paging procedure through which a terminal device reaches the network device, and where generating the occurrence indication comprises:
generating an indicator as to whether the subsequent occurrence of the access information is between a current occurrence and a subsequent occurrence of a system signature, and wherein receipt of the indicator of no occurrence of the access information between the current and subsequent occurrences causes the terminal device to be idle; and
transmitting the occurrence indication in association with the system signature, the system signature indicating a part of the access information for use by the terminal device in accessing the network device.

2. The method according to claim 1, wherein generating the occurrence indication comprises:
determining a first time point indicating a start of the subsequent occurrence of the access information; and
generating the occurrence indication based on information about the first time point.

3. The method according to claim 2, wherein generating the occurrence indication based on the information about the first time point comprises:
determining a system frame number corresponding to the first time point; and
generating the occurrence indication based on the system frame number.

4. The method according to claim 1, wherein generating the occurrence indication comprises:
determining auxiliary information about one or more of: transmission periodicity of the access information, a subsequent occurrence of the system signature, transmission periodicity of the system signature, and an index of the system signature; and
generating the occurrence indication based on the auxiliary information.

5. The method according to claim 1, wherein transmitting the occurrence indication in association with the system signature comprises:
transmitting the occurrence indication in parallel with the system signature; or
transmitting the occurrence indication after the system signature is transmitted.

6. A method implemented at a terminal device, comprising:
in response to detecting a system signature, detecting an occurrence indication indicating a subsequent occurrence of access information, the system signature indicating a part of the access information for use by the terminal device in accessing a network device, wherein the access information comprises an access information table that indicates a paging procedure through which the terminal device reaches the network device; and receiving the access information based on the occurrence indication, wherein receiving the access information based on the occurrence indication comprises:

determining whether the occurrence indication includes an indicator as to whether the subsequent occurrence of the access information is between a current occurrence and a subsequent occurrence of the system signature, and causing the terminal device to be idle when the indicator indicates no occurrence of the access information between the current and subsequent occurrence occurrences.

7. The method according to claim 6, wherein detecting the occurrence indication comprises:

detecting the occurrence indication in parallel with detection of the system signature; or detecting the occurrence indication after detection of the system signature.

8. The method according to claim 6, wherein receiving the access information based on the occurrence indication comprises:

obtaining information about a first time point from the occurrence indication, the first time point indicating a start of the subsequent occurrence of the access information; and receiving the access information at the first time point.

9. The method according to claim 6, wherein receiving the access information based on the occurrence indication comprises:

obtaining a system frame number from the occurrence indication, the system frame number indicating a frame including the subsequent occurrence of the access information; and receiving the access information at the frame indicated by the system frame number.

10. The method according to claim 6, further comprising:

determining, based on the system signature, the part of the access information for use in accessing the network device.

11. The method according to claim 6, further comprising:

obtaining auxiliary information from the occurrence indication, the auxiliary information including one or more of: transmission periodicity of the access information, a subsequent occurrence of the system signature, transmission periodicity of the system signature, and an index of the system signature.

12. A network device, comprising:

a processor and a non-transitory machine readable storage medium, the non-transitory machine readable storage medium containing instructions that, when executed on the processor, cause the network device to:

generate an occurrence indication for indicating a subsequent occurrence of access information, wherein the access information comprises an access information table that indicates a paging procedure through which a terminal device reaches the network device, and where generation of the occurrence indication comprises:

generating an indicator as to whether the subsequent occurrence of the access information is between a current occurrence and a subsequent occurrence of a system signature, and wherein receipt of the indicator of no occurrence of the access information between the current and subsequent occurrences causes the terminal device to be idle, and transmit the occurrence indication in association with the system signature, the system signature indicating a part of the access information for use by a terminal device in accessing the network device.

13. The network device according to claim 12, wherein the network device is further to:

determine a first time point indicating a start of the subsequent occurrence of the access information, and generate the occurrence indication based on information about the first time point.

14. The network device according to claim 13, wherein the determination of the first time point includes to determine a system frame number corresponding to the first time point, and the network device is to generate the occurrence indication based on the system frame number.

15. The network device according to claim 12, wherein the network device is further to:

determine auxiliary information about one or more of: transmission periodicity of the access information, a subsequent occurrence of the system signature, transmission periodicity of the system signature, and an index of the system signature, and generate the occurrence indication based on the auxiliary information.

16. The network device according to claim 12, wherein the transmission of the occurrence indication includes to:

transmit the occurrence indication in parallel with the system signature; or transmit the occurrence indication after the system signature is transmitted.

17. A terminal device, comprising:

a processor and a non-transitory machine readable storage medium, the non-transitory machine readable storage medium containing instructions that, when executed on the processor, cause the terminal device to:

detect, in response to detecting a system signature, an occurrence indication indicating a subsequent occurrence of access information, the system signature indicating a part of the access information for use by the terminal device in accessing a network device, wherein the access information comprises an access information table that indicates a paging procedure through which the terminal device reaches a network device, and receive the access information based on the occurrence indication wherein receiving the access information based on the occurrence indication comprises:

determining whether the occurrence indication includes an indicator as to whether the subsequent occurrence of the access information is between a current occurrence and a subsequent occurrence of the system signature, and causing the terminal device to be idle when the indicator indicates no occurrence of the access information between the current and subsequent occurrences.

18. The terminal device according to claim 17, wherein the terminal device is further to:

detect the occurrence indication in parallel with the system signature; or detect the occurrence indication after detection of the system signature.

19. The terminal device according to claim 17, wherein the terminal device is further to:

obtain information about a first time point from the occurrence indication, the first time point indicating a start of the subsequent occurrence of the access information, and receive the access information at the first time point.

20. The terminal device according to claim 17, wherein the terminal device is further to:

obtain a system frame number from the occurrence indication, the system frame number indicating a frame including the subsequent occurrence of the access information, and receive the access information at the frame indicated by the system frame number.

21. The terminal device according to claim 17, wherein the terminal device is further to:

determine, based on the system signature, the part of the access information for use in accessing the network device.

22. The terminal device according to claim 17, wherein the terminal device is further to:

obtain auxiliary information from the occurrence indication, the auxiliary information including one or more of: transmission periodicity of the access information, a subsequent occurrence of the system signature, transmission periodicity of the system signature, and an index of the system signature.

* * * * *